United States Patent
Wang et al.

(10) Patent No.: US 10,767,623 B2
(45) Date of Patent: Sep. 8, 2020

(54) SERRATED NOISE REDUCER FOR A WIND TURBINE ROTOR BLADE

(71) Applicant: General Electric Company, Schenectady, NY (US)

(72) Inventors: Guannan Wang, Neufahrn (DE); Benoit Philippe Armand Petijean, Moosburg (DE); Roger Drobietz, Rheine (DE)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 15/952,498

(22) Filed: Apr. 13, 2018

(65) Prior Publication Data

US 2019/0316565 A1  Oct. 17, 2019

(51) Int. Cl.
  *F03D 1/06*  (2006.01)
(52) U.S. Cl.
  CPC ........ *F03D 1/0675* (2013.01); *F05B 2240/30* (2013.01); *F05B 2250/11* (2013.01); *F05B 2260/96* (2013.01)
(58) Field of Classification Search
  CPC ................. F03D 1/0633; F03D 1/0675; F05B 2240/122; F05B 2240/30; F05B 2250/11; F05B 2260/96; F05B 2260/962
  See application file for complete search history.

(56) References Cited

U.S. PATENT DOCUMENTS

| | | |
|---|---|---|
| 175,355 A | 3/1876 | King |
| 573,562 A | 12/1896 | Wittram |
| 1,861,065 A | 5/1932 | Poot |
| RE19,412 E | 1/1935 | Zaparka |
| 2,071,012 A | 2/1937 | Adams |
| 2,225,312 A | 12/1940 | Mason |
| 2,238,749 A | 4/1941 | Peltier |
| D131,271 S | 2/1942 | Collura |
| 2,312,219 A | 2/1943 | Sensenich |

(Continued)

FOREIGN PATENT DOCUMENTS

| | | |
|---|---|---|
| CN | 105 822 511 A | 8/2016 |
| CN | 106168193 A | 11/2016 |

(Continued)

OTHER PUBLICATIONS

Oerlemans et al., Reduction of wind turbine noise using optimized airfoils and trailing-edge serrations, National Aerospace Laboratory NLR, vol. 47, Issue 6, p. 5 of 16 Pages, Jun. 2009.

(Continued)

*Primary Examiner* — Igor Kershteyn
(74) *Attorney, Agent, or Firm* — Dority & Manning, P.A.

(57) ABSTRACT

A rotor blade assembly for a wind turbine. The rotor blade assembly includes a rotor blade having surfaces defining a pressure side, a suction side, a leading edge, and a trailing edge extending between a blade tip and a blade root. The rotor blade assembly also includes at least one noise reducer secured at the trailing edge. The noise reducer(s) includes at least one serration having a base portion and at least one side edge feature extending from the base portion. Further, the base portion extends along a first plane. The side edge feature(s) extends out of the first plane so as to reduce vortices generated by the serration(s).

19 Claims, 9 Drawing Sheets

(56) References Cited

U.S. PATENT DOCUMENTS

| | | | |
|---|---|---|---|
| 2,469,167 A | 5/1949 | Little | |
| 2,899,125 A | 8/1959 | Vaghi | |
| 4,089,618 A | 5/1978 | Patel | |
| 4,204,629 A | 5/1980 | Bridges | |
| 4,618,313 A | 10/1986 | Mosiewicz | |
| 4,720,244 A | 1/1988 | Kluppel et al. | |
| 4,962,826 A | 10/1990 | House | |
| 5,088,665 A * | 2/1992 | Vijgen | B64C 23/06 244/198 |
| 5,320,491 A | 6/1994 | Coleman et al. | |
| 5,328,329 A | 7/1994 | Monroe | |
| 5,522,266 A | 6/1996 | Nicholson et al. | |
| 5,533,865 A | 7/1996 | Dassen et al. | |
| 5,819,357 A | 10/1998 | Gould | |
| 6,023,898 A | 2/2000 | Josey | |
| 6,352,601 B1 | 3/2002 | Ray | |
| 6,491,260 B2 | 12/2002 | Borchers et al. | |
| 6,729,846 B1 | 5/2004 | Wobben | |
| 6,733,240 B2 | 5/2004 | Gliebe | |
| 6,779,978 B2 | 8/2004 | Camargo Do Amarante | |
| 6,789,769 B2 | 9/2004 | Mau et al. | |
| 6,830,436 B2 | 12/2004 | Shibata et al. | |
| 7,059,833 B2 | 6/2006 | Stiesdal et al. | |
| 7,198,471 B2 | 4/2007 | Gunneskov et al. | |
| 7,328,770 B2 | 2/2008 | Owens et al. | |
| 7,351,041 B2 | 4/2008 | Uselton et al. | |
| 7,413,408 B1 | 8/2008 | Tafoya | |
| 7,458,777 B2 | 12/2008 | Herr | |
| 7,600,963 B2 | 10/2009 | Miller | |
| 7,632,068 B2 | 12/2009 | Bak et al. | |
| 7,637,721 B2 | 12/2009 | Driver et al. | |
| 7,740,206 B2 | 6/2010 | Eaton et al. | |
| 7,811,063 B2 | 10/2010 | Bonnet | |
| 7,901,189 B2 | 3/2011 | Gupta et al. | |
| 7,909,576 B1 | 3/2011 | van der Bos et al. | |
| 7,918,653 B2 | 4/2011 | Standish et al. | |
| 7,959,412 B2 | 6/2011 | Bonnet | |
| 7,976,276 B2 | 7/2011 | Riddell et al. | |
| 7,976,283 B2 | 7/2011 | Huck | |
| 8,038,407 B2 | 10/2011 | Rao | |
| 8,083,488 B2 | 12/2011 | Fritz | |
| 8,157,532 B2 | 4/2012 | Matesanz Gil et al. | |
| 8,267,657 B2 | 9/2012 | Huck et al. | |
| 8,317,479 B2 | 11/2012 | Vronsky et al. | |
| 8,414,261 B2 * | 4/2013 | Bonnet | F03D 1/0641 415/119 |
| 8,430,638 B2 | 4/2013 | Drobietz et al. | |
| 8,506,250 B2 | 8/2013 | Bagepalli et al. | |
| 8,517,682 B2 | 8/2013 | Hancock | |
| 8,523,515 B2 | 9/2013 | Drobietz et al. | |
| 8,834,127 B2 | 9/2014 | Giguere et al. | |
| 8,944,776 B2 | 3/2015 | Lenz et al. | |
| 9,329,039 B2 | 1/2016 | Herr et al. | |
| 9,341,158 B2 | 5/2016 | Smith et al. | |
| 9,494,134 B2 | 11/2016 | Kinzie | |
| 9,617,974 B2 | 4/2017 | Singh | |
| 2001/0008032 A1 | 7/2001 | Llewellyn-Jones et al. | |
| 2003/0175121 A1 | 9/2003 | Shibata et al. | |
| 2004/0219059 A1 | 11/2004 | Barringer et al. | |
| 2004/0253114 A1 | 12/2004 | Gunneskov et al. | |
| 2007/0025858 A1 | 2/2007 | Driver et al. | |
| 2007/0041823 A1 | 2/2007 | Miller | |
| 2007/0065290 A1 | 3/2007 | Herr | |
| 2007/0077150 A1 | 4/2007 | Llorente Gonzalez | |
| 2007/0125919 A1 | 6/2007 | Hopkins | |
| 2007/0294848 A1 | 12/2007 | Dumier | |
| 2008/0001363 A1 | 1/2008 | Bhate | |
| 2008/0061192 A1 | 3/2008 | Sullivan | |
| 2008/0080977 A1 | 4/2008 | Bonnet | |
| 2008/0107540 A1 | 5/2008 | Bonnet | |
| 2008/0166241 A1 | 7/2008 | Herr et al. | |
| 2008/0187442 A1 | 8/2008 | Standish et al. | |
| 2008/0298967 A1 | 12/2008 | Matesanz Gil et al. | |
| 2009/0016891 A1 | 1/2009 | Parsania et al. | |
| 2009/0050154 A1 | 2/2009 | Strothmann et al. | |
| 2009/0074585 A1 | 3/2009 | Koegler et al. | |
| 2009/0087314 A1 | 4/2009 | Haag | |
| 2009/0097976 A1 | 4/2009 | Driver et al. | |
| 2009/0104038 A1 | 4/2009 | Grabau | |
| 2009/0126131 A1 | 5/2009 | Delaere et al. | |
| 2009/0169393 A1 | 7/2009 | Bagepalli et al. | |
| 2009/0274559 A1 | 11/2009 | Petsche et al. | |
| 2010/0028161 A1 | 2/2010 | Vronsky et al. | |
| 2010/0068042 A1 | 3/2010 | Bruck et al. | |
| 2010/0101037 A1 | 4/2010 | Gross et al. | |
| 2010/0104436 A1 | 4/2010 | Gross et al. | |
| 2010/0127504 A1 | 5/2010 | Hancock | |
| 2010/0143151 A1 | 6/2010 | Kinzie et al. | |
| 2010/0266382 A1 | 10/2010 | Campe et al. | |
| 2010/0329879 A1 | 12/2010 | Presz, Jr. et al. | |
| 2011/0018282 A1 | 1/2011 | Hayashi et al. | |
| 2011/0042524 A1 | 2/2011 | Hemmelgarn et al. | |
| 2011/0142637 A1 | 6/2011 | Riddell et al. | |
| 2011/0223030 A1 | 9/2011 | Huck et al. | |
| 2011/0268558 A1 | 11/2011 | Driver et al. | |
| 2012/0027590 A1 | 2/2012 | Bonnet | |
| 2012/0070281 A1 | 3/2012 | Fuglsang et al. | |
| 2012/0141269 A1 | 6/2012 | Giguere et al. | |
| 2013/0164141 A1 | 6/2013 | Lin et al. | |
| 2013/0272892 A1 | 10/2013 | Liu | |
| 2013/0280085 A1 | 10/2013 | Koegler | |
| 2014/0093380 A1 | 4/2014 | Drobietz et al. | |
| 2014/0294592 A1 | 10/2014 | Drack et al. | |
| 2014/0369845 A1 * | 12/2014 | Ruijter | F01D 5/141 416/224 |
| 2015/0050154 A1 | 2/2015 | Dixon et al. | |
| 2015/0078896 A1 | 3/2015 | Oerlemans | |
| 2015/0078910 A1 * | 3/2015 | Oerlemans | F03D 1/0608 416/228 |
| 2015/0078913 A1 | 3/2015 | Enevoldsen et al. | |
| 2015/0233345 A1 * | 8/2015 | Olsen | F03D 1/0633 416/146 R |
| 2015/0247487 A1 | 9/2015 | Oerlemans et al. | |
| 2015/0267678 A1 * | 9/2015 | Obrecht | F03D 1/0633 416/228 |
| 2016/0052627 A1 * | 2/2016 | Piechowicz | B64C 27/467 416/1 |
| 2016/0177915 A1 * | 6/2016 | Gonzalez | F03D 1/0633 416/223 R |
| 2016/0177919 A1 * | 6/2016 | Van Garrel | F03D 1/0633 416/228 |
| 2016/0177922 A1 | 6/2016 | Zamora Rodriquez et al. | |
| 2017/0107970 A1 * | 4/2017 | Arce | F03D 1/0641 |
| 2017/0145990 A1 | 5/2017 | Drack et al. | |
| 2018/0010579 A1 | 1/2018 | Akay et al. | |

FOREIGN PATENT DOCUMENTS

| | | |
|---|---|---|
| DE | 4440744 | 5/1996 |
| DE | 102006043462 A1 | 3/2006 |
| DE | 102005019905 B4 | 12/2012 |
| EP | 1607624 A2 | 12/2005 |
| EP | 2028366 A2 | 2/2009 |
| EP | 2053240 A1 | 4/2009 |
| EP | 2216545 A2 | 8/2010 |
| EP | 2270312 A1 | 1/2011 |
| EP | 2806156 A1 | 11/2014 |
| EP | 3096003 A1 | 11/2016 |
| JP | 2000120524 A | 4/2000 |
| JP | 2003254225 A | 9/2003 |
| JP | 2008115783 A | 5/2008 |
| WO | WO 98/21091 | 5/1998 |
| WO | WO2008/035149 A2 | 3/2008 |
| WO | WO2008/113349 A2 | 9/2008 |
| WO | WO2009/025549 A1 | 2/2009 |
| WO | WO2013/045601 A1 | 4/2013 |
| WO | WO2014/048437 A1 | 4/2014 |
| WO | WO2015/074661 A1 | 5/2015 |

(56) References Cited

OTHER PUBLICATIONS

Yang, Research status on aero-acoustic noise from wind turbine blades, 6th International Conference on Pumps and Fans with Compressors and Wind Turbines, vol. 52, Issue 1, p. 7 of 10 Pages, 2013.
Risoe National Laboratory for Sustainable Energy, The Technical University of Denmark, Flexible Trailing Edge Flap for Blades to Make Wind Power Cheaper, Science Daily, Apr. 7, 2011, pp. 1-2.
Risoe National Laboratory for Sustainable Energy, Controllable Rubber Trailing Edge Flap May Ease Stress on Wind Turbine Blades, RenewableEnergyWorld.com, Feb. 17, 2010, pp. 1-3.
Risoe National Laboratory for Sustainable Energy, Successful Wind Tunnel Test of Controllable Rubber Trailing Edge Flap for Wind Turbine Blades, Feb. 19, 2010, pp. 1-2. http://www.sciencedaily.com/releases/2010/02/100217093654.htm.
EP Search Report, dated Aug. 22, 2019.

\* cited by examiner

SERRATED NOISE REDUCER FOR A WIND TURBINE ROTOR BLADE

FIELD

The present disclosure relates generally to wind turbine rotor blades, and, more particularly, to noise reducers for wind turbine rotor blades having a serrated edge.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

As the size of rotor blades increase, the noise produced by the rotor blades may also increase. As such, in certain instances, various blade add-on components may be attached to the rotor blades to assist with reducing noise generated thereby. More specifically, certain blade add-on components may be attached adjacent to the trailing edges of the rotor blades.

In some instances, conventional noise reducers may generate noise-causing vortices. More specifically, a pressure differential from a pressure side of the noise reducer to a suction side of the noise reducer may create vortices at one or more boundaries of the noise reducer. For instance, for noise reducers having serrations, vortices may form at the edges of the serrations, which can generate noise.

Accordingly, the present disclosure is directed to noise reducers having at least one serration with an edge that minimizes the aforementioned noise-producing vortices.

BRIEF DESCRIPTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes a rotor blade having surfaces defining a pressure side, a suction side, a leading edge, and a trailing edge extending between a blade tip and a blade root. The rotor blade assembly also includes at least one noise reducer secured at the trailing edge. The noise reducer(s) includes at least one serration having a base portion and at least one side edge feature extending from the base portion. Further, the base portion extends along a first plane. In addition, the side edge feature(s) extends out of the first plane so as to reduce vortices generated by the serration(s).

In one embodiment, the base portion of the serration(s) may have a triangular cross-section. In another embodiment, the noise reducer(s) may further include a base plate secured at the trailing edge. Further, the serration(s) may extend from the base plate. In such embodiments, the serrations(s) may be integral with the base plate. In alternative embodiments, the serration(s) may be coupled to the base plate.

In one embodiment, the side edge feature(s) may extend toward at least one of the suction side or the pressure side of the rotor blade. In a further embodiment, the serration(s) may further include opposing side edge features on opposing sides of the base portion. In such embodiments, the opposing side edge features may be integral with the base portion. In alternative embodiments, the opposing side edge features may be separately coupled to the base portion.

In further embodiments, the side edge feature(s) may extend at an angle out of the first plane of the base portion equal to or less than about 90 degrees. For example, in one embodiment, the side edge feature(s) may extend generally perpendicular out of the first plane of the base portion.

In further embodiments, the side edge feature(s) may be tapered. In additional embodiments, the side edge feature(s) may be curved. In still further embodiments, the side edge feature(s) may have a generally arcuate cross-section.

In another aspect, the present disclosure is directed to a rotor blade assembly for a wind turbine. The rotor blade assembly includes a rotor blade having surfaces defining a pressure side, a suction side, a leading edge, and a trailing edge extending between a blade tip and a blade root. The rotor blade assembly also includes at least one noise reducer secured at the trailing edge. Further, the noise reducer(s) includes at least one serration having opposing side edges. In addition, the serration(s) has a radius of curvature defined between the opposing side edges that is configured to reduce vortices generated by the side edges of the serration(s).

In one embodiment, the radius of curvature may face at least one of the suction side or the pressure side of the rotor blade. It should be further understood that the rotor blade assembly may further include any of the additional features as described herein.

In yet another aspect, the present disclosure is directed to a noise reducer for a rotor blade of a wind turbine. The noise reducer includes at least one serration including a base portion configured for securement to a trailing edge of the rotor blade. Further, the base portion extends along a first plane. The noise reducer also includes at least one side edge feature extending from the base portion. Further, the side edge feature(s) extends out of the first plane so as to reduce vortices generated by the serration(s). It should be further understood that the noise reducer may further include any of the additional features as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
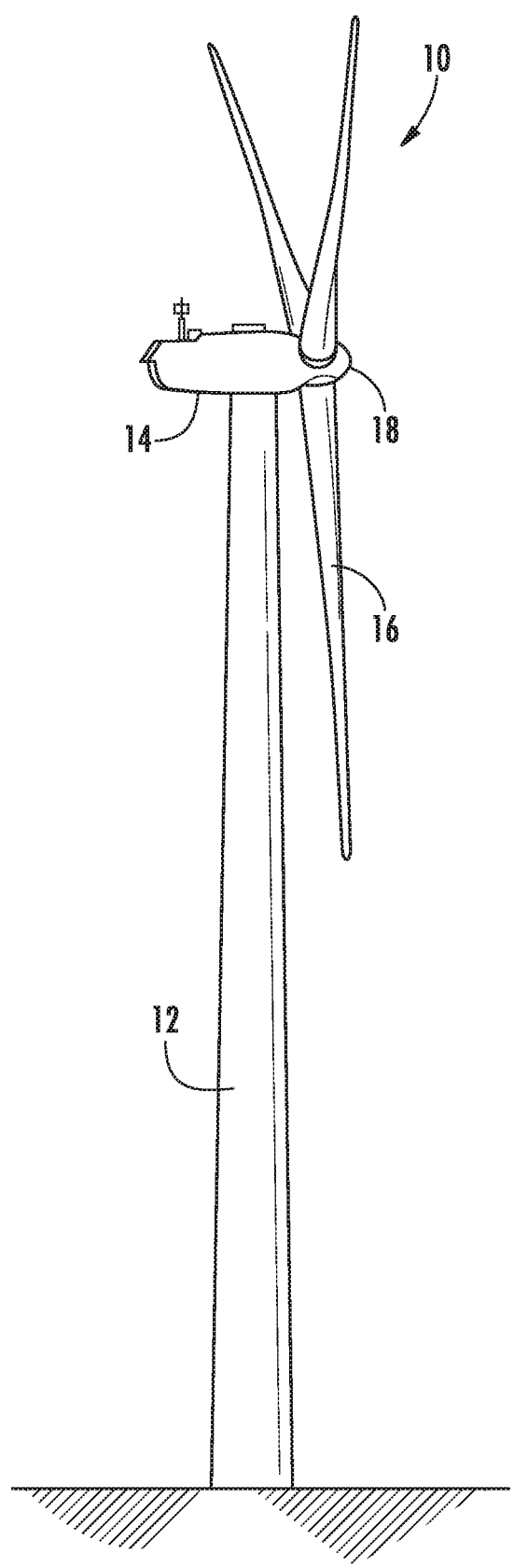
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
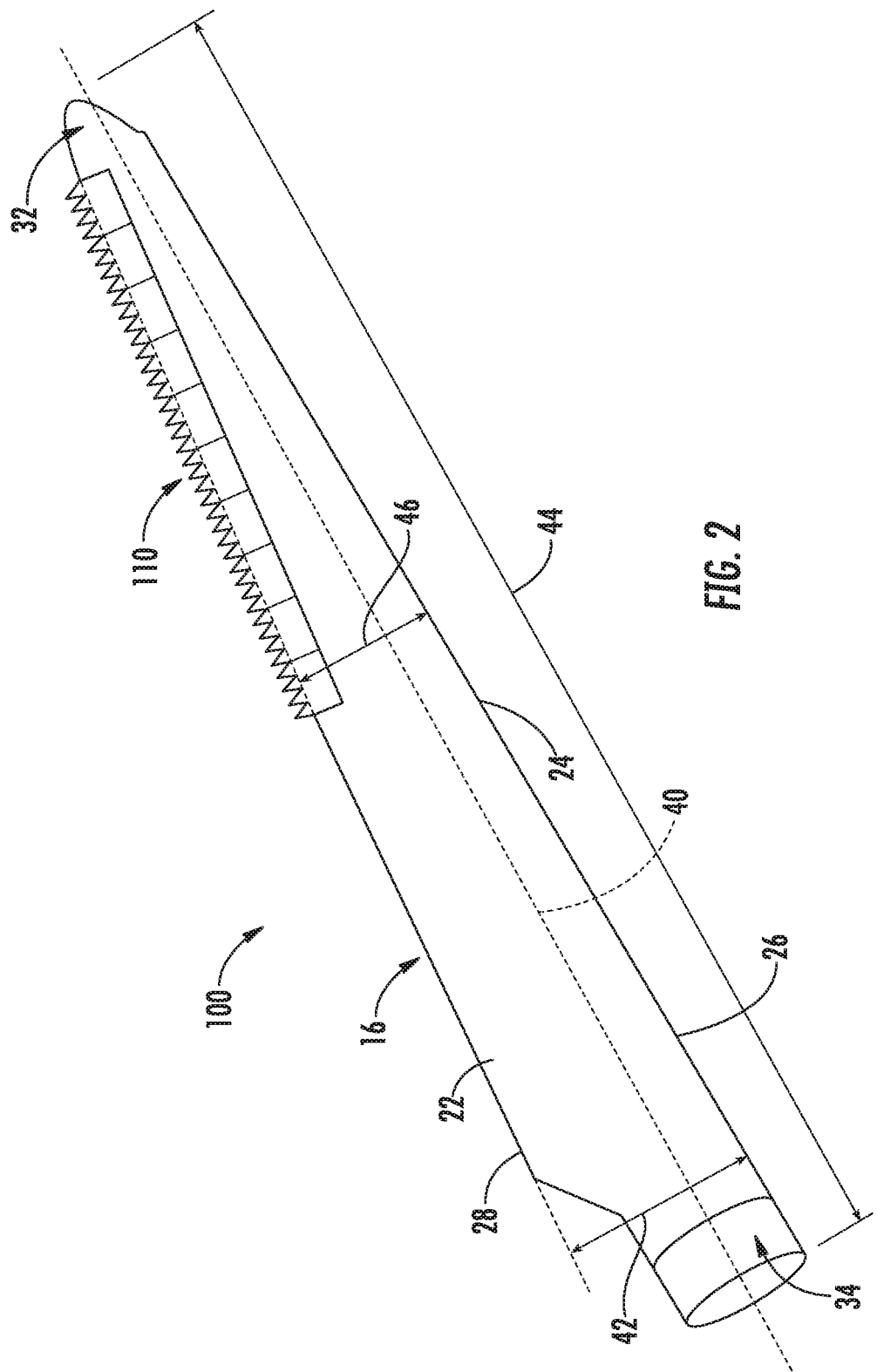
FIG. 2 illustrates a perspective view a rotor blade assembly according to the present disclosure, particularly illustrating a plurality of noise reducers secured at the trailing edge of the rotor blade.

Referring now to FIG. 2, a perspective view of a rotor blade assembly 100 including one of the rotor blades 16 of FIG. 1 is illustrated. As shown, the rotor blade assembly 100 includes the rotor blade 16. Further, the rotor blade 16 generally includes surfaces defining a pressure side 22 and a suction side 24 extending between a leading edge 26 and a trailing edge 28, and may extend from a blade tip 32 to a blade root 34. In one embodiment, the rotor blade 16 may include a plurality of individual blade segments aligned in an end-to-end order from the blade tip 32 to the blade root 34. As such, each of the individual blade segments may be uniquely configured so that the plurality of blade segments defines a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

In addition, the rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

Still referring to FIG. 2, the rotor blade 16 may further define a pitch axis 40. The pitch axis 40 may generally be defined with respect to the rotor hub 18 of the wind turbine 10. For example, the pitch axis 40 may extend generally perpendicularly to the rotor hub 18 and the blade root 34 through the center of the blade root 34. A pitch angle or blade pitch of the rotor blade 16, i.e., an angle that determines a perspective of the rotor blade 16 with respect to the airflow past the wind turbine 10, may be defined by rotation of the rotor blade 16 about the pitch axis 40. The rotor blade 16 may further define a chord 42 and a span 44. As shown in FIG. 2, the chord 42 may vary throughout the span 44 of the rotor blade 16. Thus, a local chord 46 may be defined for the rotor blade 16 at any point on the rotor blade 16 along the span 44.

In addition, as shown, the rotor blade assembly 100 includes at least one noise reducer 110, e.g. secured at or near the trailing edge 28. Alternatively, the noise reducer 110 may be secured at or near adjacent the leading edge 26 of the rotor blade 16, adjacent to the blade tip 32, and/or adjacent to the blade root 34 of the rotor blade 16. Thus, it should be understood that the noise reducer 110 may be secured at any suitable location along any of the surfaces of the rotor blade 16. As such, the noise reducer 110 is configured to reduce noise generated by the rotor blades 16 during operation of the wind turbine 10 and/or may increase the efficiency of the rotor blades 16. The noise reducer 110 may be secured to the rotor blade 16 using any suitable means, such as by adhesives, tape, welding, and/or mechanical fasteners (e.g., bolts, screws, and rivets).

Further, as shown, the noise reducer(s) 110 may extend along a portion of the trailing edge 28 of the rotor blade 16. For example, the noise reducer(s) 110 may extend along a portion of the trailing edge 28 near the blade tip 32, as shown in FIG. 2. In other embodiments, the noise reducer(s) 110 may extend along a portion of the trailing edge 28 near the blade root 34. Still, in other embodiments, the noise reducer(s) 110 may extend along a portion of the rotor blade 16 in between the blade tip 32 and the blade root 34. It should also be recognized that the noise reducer(s) 110 may extend along the entirety of the trailing edge 28.

Figure 3:
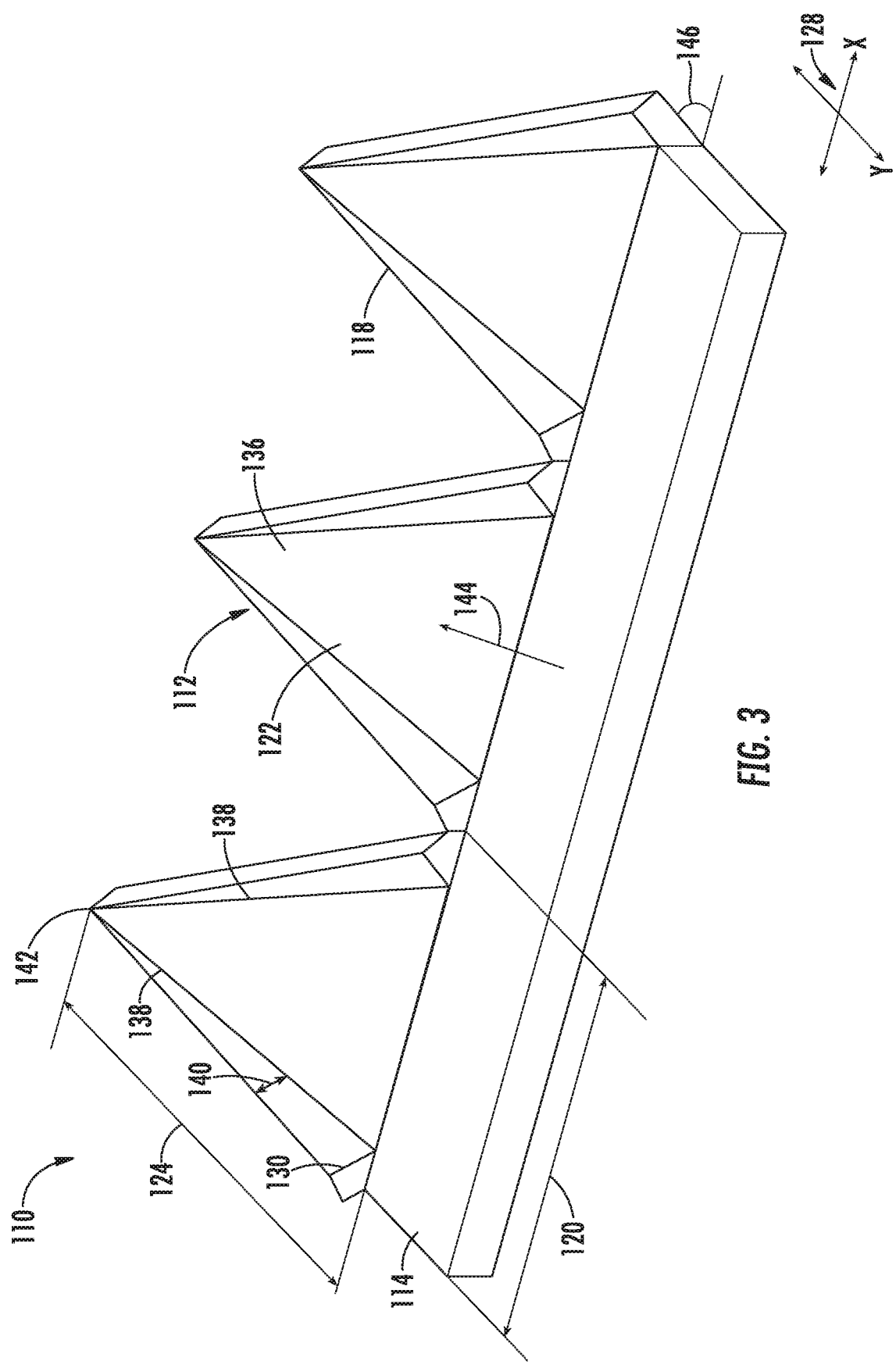
FIG. 3 illustrates a perspective view of one embodiment of a noise reducer according to the present disclosure, particularly illustrating a noise reducer having a plurality of serrations that each include side edge features.
Figure 4:
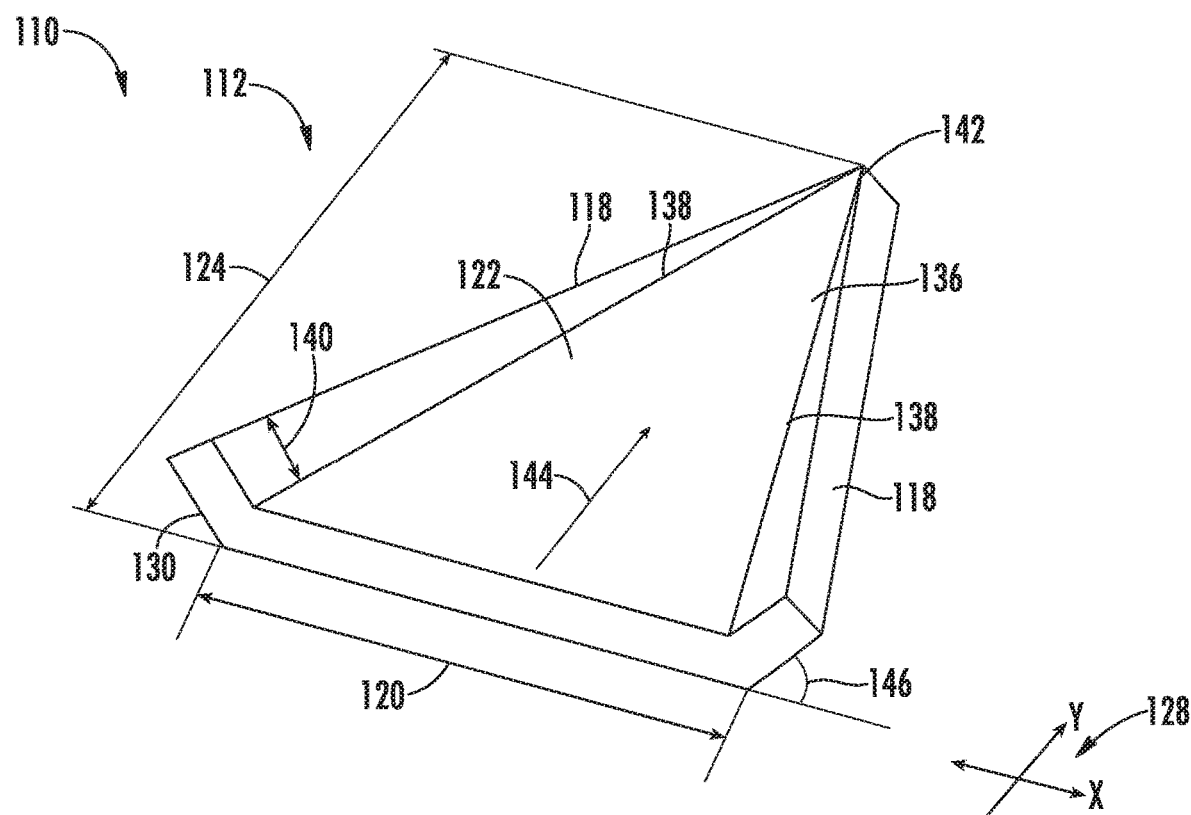
FIG. 4 illustrates a perspective view of another embodiment of a noise reducer according to the present disclosure, particularly illustrating a noise reducer having a single serration that includes opposing, straight side edge features.
Figure 5:
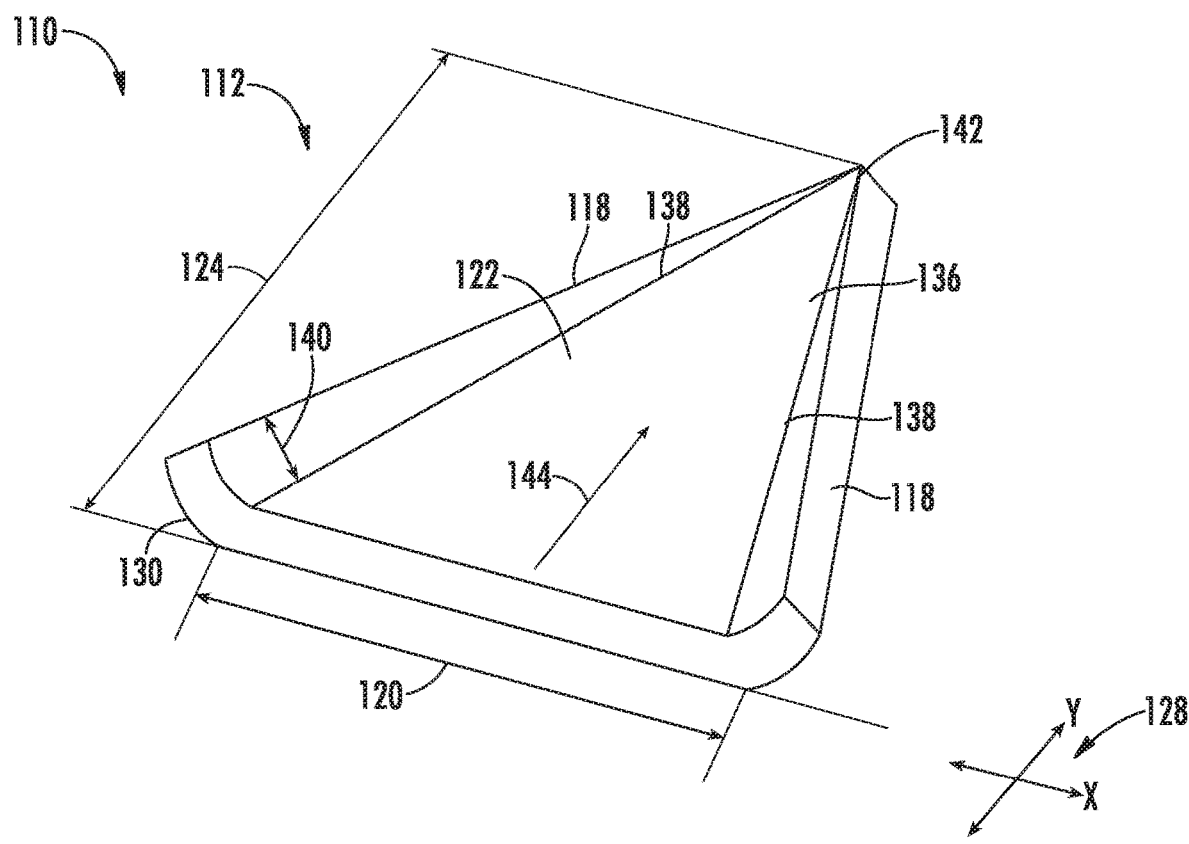
FIG. 5 illustrates a perspective view of yet another embodiment of a noise reducer according to the present disclosure, particularly illustrating a noise reducer having a single serration that includes opposing, curved side edge features.
Figure 6:
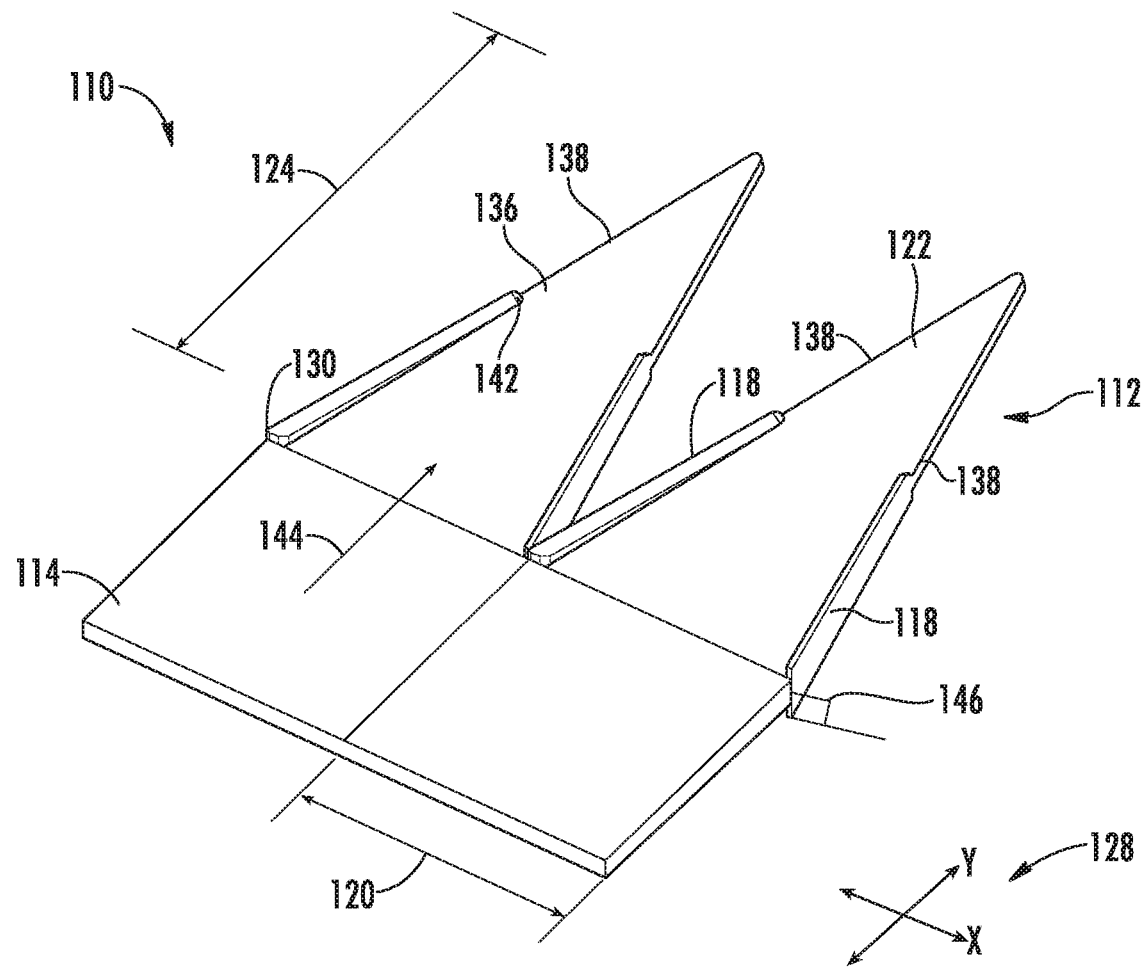
FIG. 6 illustrates a perspective view of still another embodiment of a noise reducer according to the present disclosure, particularly illustrating a noise reducer having a plurality of serrations each including a base portion and opposing side edge features that are generally perpendicular to the base portion.
Figure 7:
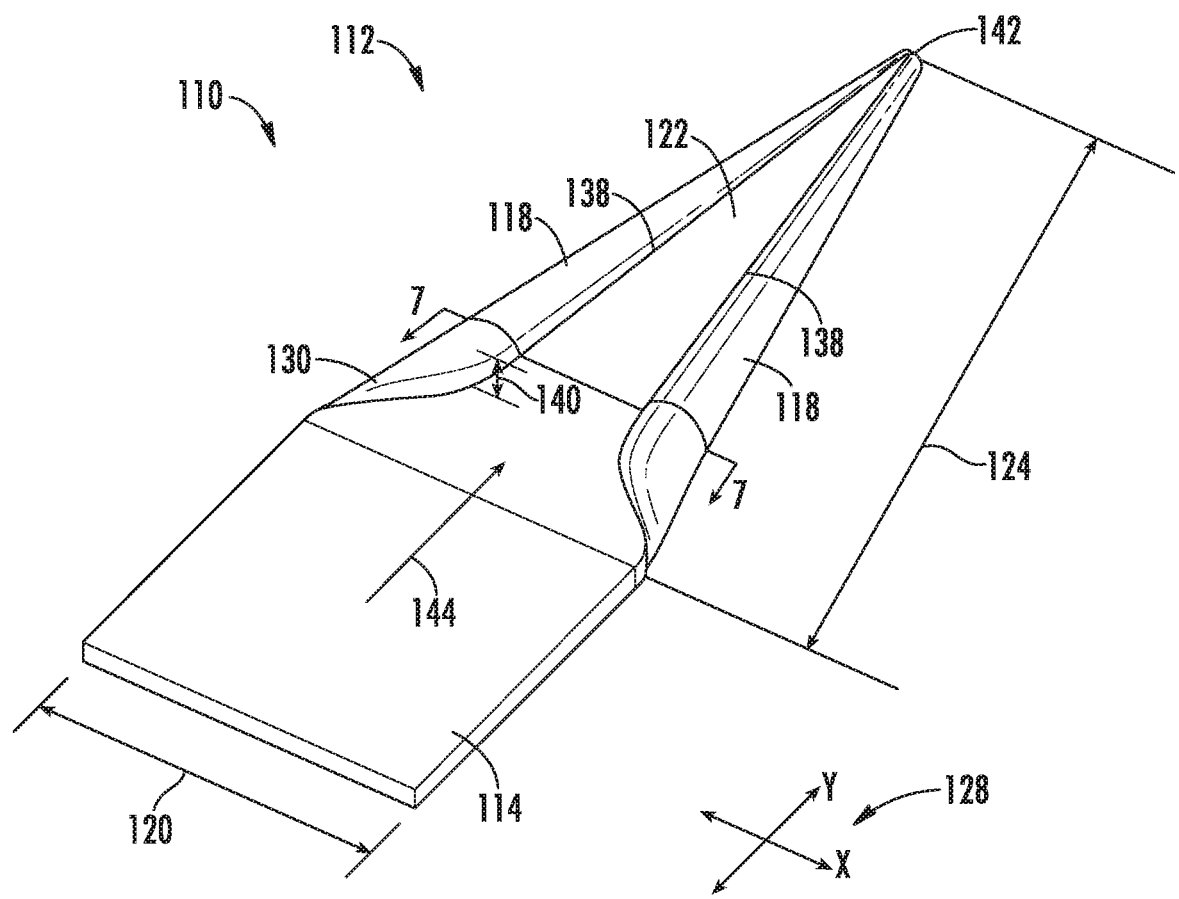
FIG. 7 illustrates a perspective view of another embodiment of a noise reducer according to the present disclosure, particularly illustrating a noise reducer having a serration with opposing side edge features each having a generally arcuate cross-section.
Figure 8:
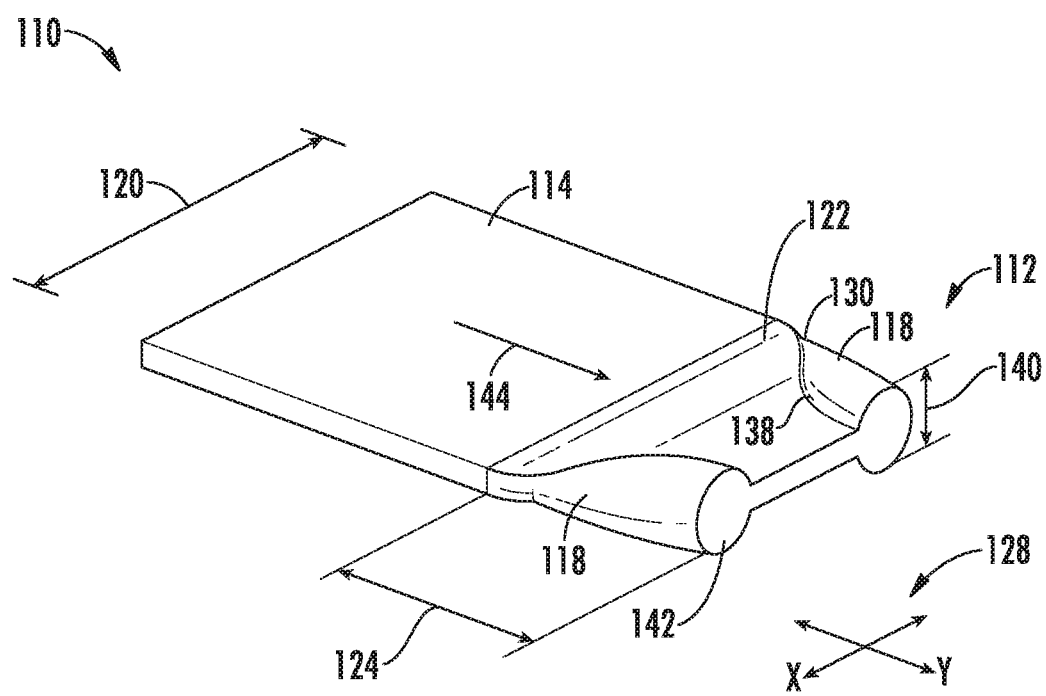
FIG. 8 illustrates a partial, perspective view of the serration illustrated in FIG. 7, particularly illustrating a cross-sectional view of the serration along line 7-7.
Figure 9:
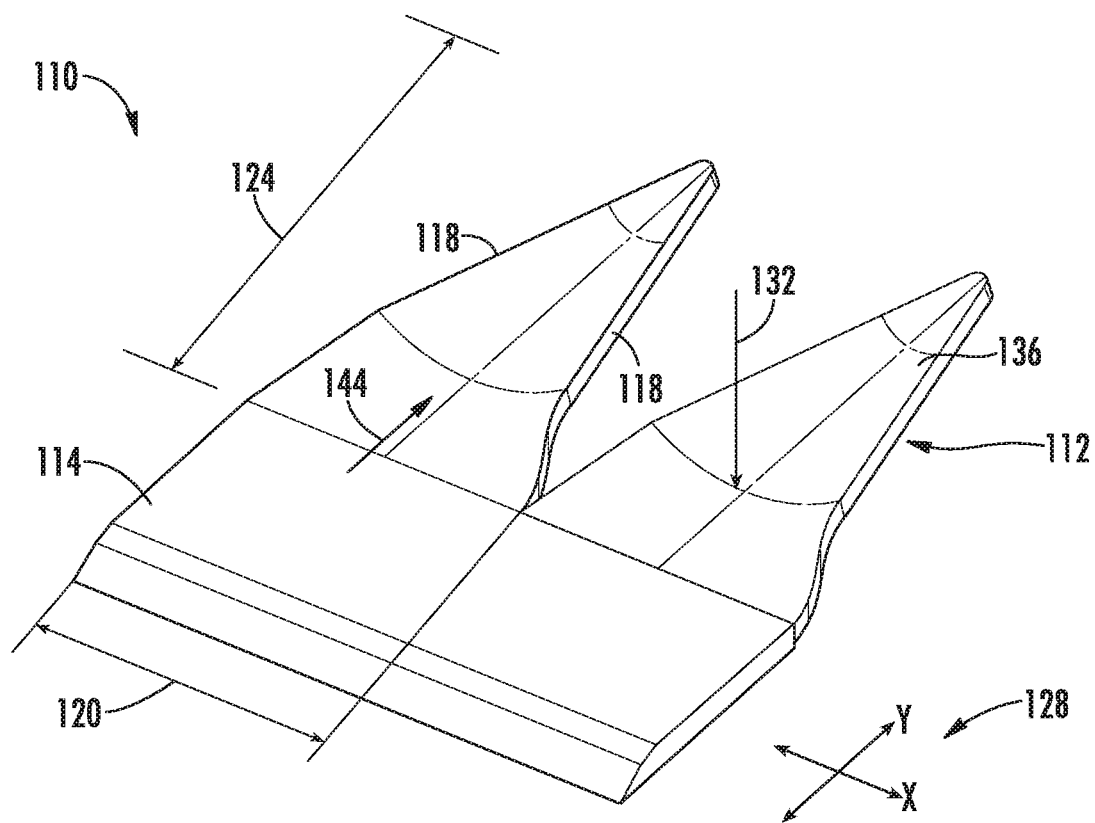
FIG. 9 illustrates a perspective view of a further embodiment of a noise reducer according to the present disclosure, particularly illustrating a noise reducer having a plurality of serrations each including a radius of curvature.

Referring now to FIGS. 3-9, multiple perspective views of various embodiments of the noise reducers 110 according to the present disclosure are illustrated. More particularly, as shown, the noise reducers 110 of the present disclosure each include at least one serration 112. For example, FIGS. 3, 6, and 9 illustrate perspective views of various embodiments of the noise reducer 110 having a plurality of serrations 112 according to the present disclosure. FIGS. 4, 5, 7, and 8 illustrate perspective views of various embodiments of the noise reducer 110 having a single serration 112 according to the present disclosure. It should be understood that each noise reducer 110 may include any number of serrations 112.

Moreover, as shown in FIGS. 3-8, the serration(s) 112 may each include a base portion 122 extending along a first plane 128. For example, as shown in FIG. 3, the first plane 128 of the base portion 122 may be defined by an X-Y plane relative to an X-Y coordinate system. Thus, as shown, the serration(s) 112 may define a length 124 relative to a Y-axis. Further, as shown, the serrations(s) 112 may define a width 120 relative to an X-axis. In addition, as shown, the base portion 122 may have a generally triangular cross-section 136. It should be recognized that, in other embodiments, the base portion 122 may have any other suitable cross-sectional shape.

In addition, as shown in FIGS. 3 and 6-9, the noise reducers 110 described herein may also include a base plate 114 that can be secured to the rotor blade 16. More specifically, in certain embodiments, the base plate 114 may be secured at the trailing edge 28 of the rotor blade 16. In such embodiments, the serration(s) 112 may extend from the base plate 114, e.g. and past or beyond the trailing edge 28. In addition, the serration(s) 112 may be integral with the base plate 114 and/or may be separately coupled to the base plate 114. In alternative embodiments, as shown in FIGS. 4 and 5, the noise reducers 110 may be absent of a base plate 114. In such embodiments, the serration(s) 112 may be mounted directly to the rotor blade 16. As such, the base plate 114 and/or the serration(s) 12 of the noise reducer(s) 110 may be secured to the rotor blade 16 using any suitable means, such as by adhesives, tape, welding, and/or mechanical fasteners (e.g., bolts, screws, and rivets).

Referring particularly to FIGS. 3-8, the serration(s) 112 of the noise reducer(s) 110 described herein may include one or more side edge features 118 extending from the base portion 122. For example, as shown, each serration 112 may include opposing side edge features 118 on opposing sides 138 of the base portion 122. In one embodiment, the opposing side features 118 may be integral with the base portion 122. Alternatively, the opposing side edge features 118 may be separate features that are coupled to the base portion 122. For example, the side edge feature(s) 118 may be coupled to the base portion 122 using any suitable means, such as by adhesives, tape, welding, and/or mechanical fasteners (e.g., bolts, screws, and rivets). As such, the opposing side edge 118 features are configured to define a flow path (represented by arrow 144) therebetween. Thus, vortices that are typically generated by edges of the serrations 112 may be reduced. Accordingly, the reduction of such vortices may decrease a noise profile of the wind turbine 10 while also increasing the efficiency of the rotor blade 16.

Referring still to FIGS. 3-8, the side edge feature(s) 118 may extend out of the first plane 128 defined by the base portion 122 so as to reduce the vortices generated by the serration(s) 112. More specifically, as shown in FIGS. 3, 4, and 6, the side edge features 118 extend out of the first plane 128 of the base portion 122 at a predetermined angle 146. For example, in one embodiment, the predetermined angle 146 may be equal to or less than 90 degrees. For instance, in certain embodiments, the predetermined angle 146 may be from about 5 degrees to about 25 degrees.

As shown particularly in FIG. 6, the side edge features 118 may be generally perpendicular to the first plane 128 of the base portion 122. Thus, the side edge feature(s) 118 are configured to provide an additional boundary between airflow leaving the pressure side 22 of the rotor blade 16 and suction side 24 of the rotor blade 16. As such, the side edge feature(s) 118 are configured to impede the formation of vortices, reduce the size of such vortices, and/or decrease the intensity of the vortices that would otherwise form by flat edges of the serration(s) 112.

In certain embodiments, the side edge feature(s) 118 may extend towards the suction side 24 of the rotor blade 16. For example, the noise reducer(s) 110 may be attached to the rotor blade 16 such that the side edge feature(s) 118 faces toward the suction side 24 of the rotor blade 16. In other embodiments, the side edge feature(s) 118 may extend toward the pressure side 22 of the rotor blade 16. For example, the noise reducer(s) 110 may be attached to the rotor blade 16 such that the side edge feature(s) 118 faces toward the pressure side 22 of the rotor blade 16. Still, in further embodiments, one or more of the serrations 112 may include side edge features 118 that face the suction side 24 of the rotor blade 16 while other serrations 112 may include side edge features 118 that face the pressure side 22 of the rotor blade 16.

In additional embodiments, as shown in FIG. 6, the side edge features 118 may extend along a portion of the sides 138 of the base portion 122. In alternative embodiments, the side edge features 118 may extend along the entirety of the sides 138 of the base portion 122. In further embodiments, it should be understood that the side edge features 118 may be linear or may be curved. For example, FIGS. 3, 4, and 6 illustrate linear side edge features 118. Alternatively, as shown in FIG. 5, the side edge features 118 may be curved. In such embodiments, as shown, the side edge features 118 may curve outward from the base portion 122 and into the first plane 128.

In other embodiments, as shown in FIGS. 7 and 8, the side edge features 118 of the serrations 112 may have a generally arcuate cross-section. For example, as shown, the cross-section of the side edge features 118 are generally circular. In such embodiments, the side edge features 118 may extend outward from the base portion 122 and/or the first plane 128.

In addition, as shown in FIGS. 3-8, the side edge feature(s) 118 may be tapered. For example, as shown, the side edge feature(s) 118 may define a thickness 140 that tapers from a first end 130 of the serration(s) 112 to a second end 142 thereof. In certain embodiments, the slope of the taper of the side edge features 118 may be linear or may be non-linear.

Referring now to FIG. 9, a perspective view of another embodiment of the noise reducer 110 having a plurality of serrations 112 according to the present disclosure is illustrated. More specifically, as shown, each of the serrations 112 has sides edges 118 that define a radius of curvature 132 configured to reduce vortices generated by the side edges 118 of the serration(s) 112. Thus, as shown, the side edges 118 define the flow path 144 that directs air therethrough so as to reduce vortices generated by the serration(s) 112. It should be recognized that the radius of curvature 132 may vary based on the overall size of the serration(s) 112. In certain embodiment, the radius of curvature 132 may change along the length 124 of the serration(s) 112. For example, the radius of curvature 132 may have a maximum value near the base plate 114 and transition to a smaller radius of curvature 132 along the length 124 and/or transition to a flat portion.

In certain embodiments, the radius of curvature 132 may face the suction side 24 of the rotor blade 16. For example, the noise reducer(s) 110 may be attached to the rotor blade 16 such that the radius of curvature 132 faces the suction side 24 of the rotor blade 16. In another embodiment, the radius of curvature 132 may face the pressure side 22 of the rotor blade 16. For example, the noise reducer(s) 110 may be attached to the rotor blade 16 such that radius of curvature 132 faces the pressure side 22 of the rotor blade 16. Still, in further embodiments, one or more of the serrations 112 may include radii of curvature 132 facing the suction side 24 of the rotor blade 16 while other serrations 112 includes radii of curvature 132 facing the pressure side 22 of the rotor blade 16.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
   a rotor blade having surfaces defining a pressure side, a suction side, a leading edge, and a trailing edge extending between a blade tip and a blade root; and,
   at least one noise reducer secured at the trailing edge, the noise reducer comprising at least one serration, the at least one serration comprising a base portion and at least one side edge feature extending from the base portion, the base portion extending along a first plane, the side edge feature extending out of the first plane so as to reduce vortices generated by the serration, the side edge feature having a circular cross-section.

2. The rotor blade assembly of claim 1, wherein the at least serration further comprises opposing side edge features on opposing sides of the base portion.

3. The rotor blade assembly of claim 2, wherein the opposing side edge features are integral with the base portion.

4. The rotor blade assembly of claim 2, wherein the opposing side edge features are separately coupled to the base portion.

5. The rotor blade assembly of claim 1, wherein the at least one side edge feature extends toward both the suction side or the pressure side of the rotor blade.

6. The rotor blade assembly of claim 1, wherein the base portion of the at least one serration comprises a triangular planform.

7. The rotor blade assembly of claim 1, wherein the at least one side edge feature is curved.

8. The rotor blade assembly of claim 1, wherein the at least one side edge feature defines a thickness which tapers from a first end of the at least one serration to a second end thereof.

9. A rotor blade assembly for a wind turbine, the rotor blade assembly comprising:
   a rotor blade having surfaces defining a pressure side, a suction side, a leading edge, and a trailing edge extending between a blade tip and a blade root; and,
   at least one noise reducer secured at the trailing edge, the noise reducer comprising a plurality of serrations, each of the of serrations comprising opposing side edges, each of the serrations comprising a radius of curvature extending between the opposing side edges, wherein all of the radius of curvatures of the plurality of serrations are oriented in a uniform direction, the radius of curvatures being configured to reduce vortices generated by the side edges of the serration.

10. The rotor blade assembly of claim 9, wherein the noise reducer further comprises a base plate secured at the trailing edge, the plurality of serrations extending from the base plate.

11. The rotor blade assembly of claim 10, wherein the at least one serration is integral with the base plate.

12. The rotor blade assembly of claim 10, wherein the plurality of serrations are coupled to the base plate.

13. The rotor blade assembly of claim 10, wherein the radius of curvature extending between the opposing side edges has a maximum value proximal to the base plate and a transition to smaller radius of curvature along a length of each of the serrations.

14. The rotor blade assembly of claim 9, wherein the radius of curvatures uniformly face the suction side or the pressure side of the rotor blade.

15. The rotor blade assembly of claim 9, wherein the plurality of serrations comprise a generally triangular planform.

16. A noise reducer for a rotor blade of a wind turbine, the noise reducer comprising:
   at least one serration comprising:
   a base portion configured for securement to a trailing edge of the rotor blade, the base portion extending along a first plane; and,
   at least one side edge feature extending from the base portion, the side edge feature extending out of the first plane so as to reduce vortices generated by the serration, the side edge feature having an arcuate cross-section.

17. The noise reducer of claim 16, wherein the at least one serration further comprises opposing side edge features on opposing sides of the base portion.

18. The noise reducer of claim 16, wherein the at least one side edge feature extends toward at least one of a suction side or a pressure side of the rotor blade.

19. The noise reducer of claim 16, wherein the at least one side edge feature defines a thickness which tapers from a first end of the at least one serration to a second end thereof.

* * * * *